Aug. 21, 1962    M. B. WILLIAMSON    3,050,628
METHOD OF DETERMINING COMPOSITION OF AN OIL AND WATER MIXTURE
Filed June 19, 1957
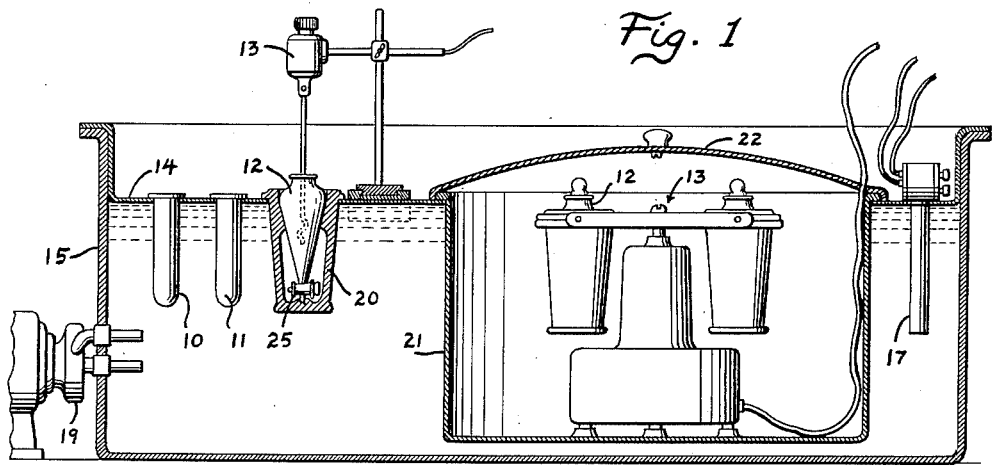
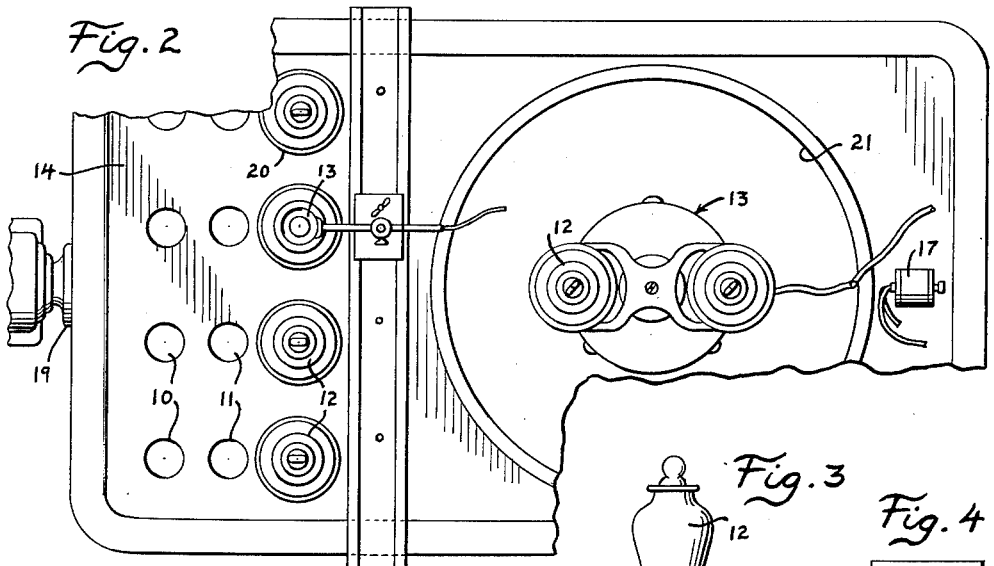
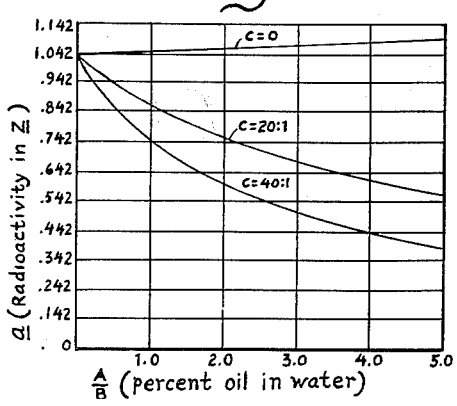
Inventor
Martin B. Williamson
By McCanna, Morsbach & Pillote
Attys.

United States Patent Office 3,050,628
Patented Aug. 21, 1962

3,050,628
METHOD OF DETERMINING COMPOSITION OF AN OIL AND WATER MIXTURE
Martin B. Williamson, Villa Park, Ill., assignor, by mesne assignments, to The Kartridg Pak Co., a corporation of Iowa
Filed June 19, 1957, Ser. No. 666,558
6 Claims. (Cl. 250—106)

This invention relates to an improved method for determining the composition of a mixture or emulsion having an oil phase and a water phase and particularly to an improved method for determining the percentage of butter fat in milk and similar products.

Various different tests have been used in the measurement of butter fat in milk. Of the different known tests, the "Babcock test" and the "Mojonnier" modification of the "Rose-Gottlieb" are the most commonly used and generally have been adopted as standard tests. In the Babcock test, and modifications thereof, the fat in the test specimen is liberated in a butyrometer by the addition of suitable reagents for the purpose of dissolving the casein and breaking down the emulsion. The resultant mixture is then generally centrifuged and the volume of the fat in the specimen is measured in the measuring tube on the butyrometer. While this test can be carried out comparatively rapidly, the accuracy of the test is dependent upon a number of factors, among which is the accurate detection of the line of separation between the fat phase and the water phase of the test specimen. In practice, charred or non-dissolved particles of non-fat solids frequently occur around the base of the butter fat column which obscure the line of demarcation at the base of the fat column and render accurate reading of the volume of the fat difficult.

The Mojonnier modification of the "Rose-Gottlieb test" is generally considered more accurate than the "Babcock test" but requires a considerably longer time to complete each test. In this test, the fat in the test specimen is first dissolved by the addition of suitable fat-solvent reagents and is then drawn off into a separate container. The fat solvent in the separate container is then slowly evaporated, and the remaining fat is then weighed and compared to the weight of the original specimen to determine the percentage of fat therein.

In the above described methods, it is necessary to completely separate the fat phase from the water phase of the specimen. In the "Babcock test" the total volume of the fat in the specimen is measured and in the "Mojonnier" modification of the "Rose-Gottlieb test," the total weight of the fat in the specimen is measured. Because of the necessity of accurately determining the line of demarcation at the lower end of the fat column in the "Babcock test" and the necessity of completely drawing off all the dissolved fat in the "Rose-Gottlieb test," it is apparent that these tests require close personal control and could not be practically carried out by an automatic apparatus.

An important object of this invention is to provide a method for rapidly and accurately measuring the percentage composition of a mixture or emulsion having a water phase and a fat phase.

Another object of this invention is to provide a method for measuring the percentage composition of a mixture having a water phase and a fat phase, which method does not require close personal control and which is adapted to be carried out by a semi-automatic or automatic apparatus.

Another object of this invention is to provide a method, in accordance with the foregoing objects, which is adapted to produce an electrical signal correlative with the percentage of the water or fat phase, in a mixture of the two phases, to enable use of the method in the operation of automatic control apparatus to maintain any desired ratio between the water and fat phases.

A more particular object of this invention is to provide a method for measuring the percentage of either the water phase or the fat phase in a mixture of the two phases, which method does not require complete separation of the water phase and fat phases to produce a measurement correlative with the composition of the mixture.

These, together with various ancillary objects and advantages of this invention will be more readily understood by reference to the following detailed description when taken in connection with the accompanying drawings, wherein:

FIGURE 1 is a vertical sectional view through a suitable apparatus for use in performing certain steps of the process and for maintaining the specimens and reagents at a constant temperature during the performance of these steps;

FIG. 2 is a top plan view of the apparatus shown in FIGURE 1;

FIG. 3 is a diagrammatic view illustrating the step of separating a sample of one phase of the system;

FIG. 4 is a diagrammatic view illustrating the step of measuring the radioactivity in the sample, and FIG. 5 is a graph illustrating the variation in the measured radioactivity in the sample with changes in the ratio of the oil phase to the water phase in the total system.

Briefly, the method of the present invention comprises adding a radioactive labeled compound having a known or readily determined "partition coefficient" to the test specimen; completely separating at least a part of one phase of the test specimen from the remainder of the test specimen, and measuring the radioactivity in a portion of said one phase of the test specimen to thereby produce a measurement correlative with the percentage composition of the mixture of the oil and water phases. The method only requires drawing off a known quantity of one of the separated phases, and does not require complete separation of the two phases, so that the measurement does not require close personal control and may be performed by automatic apparatus. Moreover, by suitable choice of compound of the proper "partition coefficient" the change in radioactivity in the phase on which the measurement is taken can be made relatively high for even small changes in percentage composition of the mixture so that the accuracy of the measurement is thereby materially enhanced.

The method of the present invention is generally adapted for measuring the amount of oil or water in a mixture or emulsion containing an oil and water phase, but for convenience, will be specifically described in connection with the measurement of the amount of fat in a specimen of milk and similar products.

In the practice of the present method, it is necessary to know or accurately measure the volume of the specimen being tested, which measurement can be effected in any desired manner. For example, one of the test tubes 10 can be either filled with an accurately measured volume of specimen, or, if the volume of the test tube is known, the test tube can be completely filled to provide a known volume of specimen.

A reagent to be added to the test specimen is also accurately measured. The reagent used in performing the tests comprises a compound of a type which has a different solubility rate in the oil and water phases of the sample, which compound is labeled with a radioactive material such as radioactive carbon or radioactive sulphur. Only a very small amount of the labeled compound need be used in making the tests and, although this small amount could be measured alone, it is more convenient to dilute the labeled compound with a liquid which is itself completely separable with one of the phases of the original specimen and then measure a volume of the diluted mixture. For example, a quantity of the compound can be mixed with a volume of water to provide a mixture having a known amount of radioactivity per unit of volume. In addition, a de-emulsifying agent, if any is required, may be added to the solution to aid in separating the oil and water phases of the specimen as is well known to the art. A volume of the reagent can then be measured, as by filling one of the test tubes 11 with a known amount of reagent.

Various different compounds, labeled with different radioactive materials may be used. However, it is necessary that the compound have a different solubiilty rate in the water and fat phases of the mixture and, preferably, the compound is such that it is soluble in both the water and fat phases, but to relatively different degrees. In the measurement of mixtures having a low percentage of one phase, the compound is, for reasons set forth hereinafter, preferably selected to be relatively highly soluble in the low percentage phase of the mixture and only slightly soluble in the high percentage phase of the mixture. For convenience, the ratio of solubility of the labeled compound in one phase of the mixture to the solubility of the compound in the other phase of the mixture is hereinafter referred to as the "partition coefficient" of the compound.

It is also necessary that the labeled compound which is used be such that the partition coefficient of the compound is not affected or changed by the de-emulsifying agent added to the reagent solution or subsequently to the mixture of the specimen and the reagent solution, to facilitate separation of the oil and water phases of the specimen. In testing milk, it is preferable to use a basic solution to break the emulsion since the addition of acids strong enough to be useful in breaking emulsions produce heat. It is therefore necessary, in testing milk, to use a labeled compound which is not affected by the substances in the solution. Among the radioactive carbon compounds which usually do not change solubility in water with relatively small changes in acidity or basicity are many substituted ethers and ketones. Also radioactive sulphur compounds such as tetraphenylthiourea and tetraethylthiourea may be used. Because radioactive sulphur has a shorter "half-life" it is generally preferable to use radioactive sulphur compound to decrease the possibility of radiation hazard. Obviously, other compounds having the desired partition coefficient and labeled with different radioactive materials may be used, if desired.

The measured volume of the test specimen in one of the tubes 10, and the measured volume of reagent, on one of the tubes 11 are then mixed in a receptacle 12. A mechanical stirrer 13, or other means of agitation, is provided to assure thorough intermixing so that the equilibrium of the "partition coefficient" can be established. The oil and water phases of the mixture of the test specimen and reagents are thereafter separated. In some mixtures separation can be effected by merely allowing the mixture to stand for a period of time. In other mixtures, it is necessary to expedite separation of the two phases by centrifuging the mixture. This is conveniently effected by positioning the receptacle 12 containing the mixture in a centrifuge 13 and centrifuging the mixture sufficiently to effect complete separation of at least a portion of one phase of the mixture. As is apparent, the necessity of adding a de-emulsifying agent will depend on the nature of the test sample. If desired, the de-emulsifying agent may be added after the labeled compound is added to the sample, or at the same time.

The partition coefficient of the labeled compound, that is the ratio of the solubility of the labeled compound in the oil phase to the solubility of the labeled compound in the water phase, will vary somewhat with temperature and it is therefore desirable to maintain the temperature substantially constant during the whole process, preferably within plus or minus one-half degree F. As shown in FIGS. 1 and 2, the test tubes 10 and 11 are supported by a rack 14 in a casing 15. The test tubes, and the reagents are maintained at a preselected temperature by circulating a fluid, such as water, in the casing and either heating or cooling the fluid to maintain a preselected temperature. In the specific apparatus illustrated, a heater 17 is provided for heating the liquid and a thermally sensitive element, conveniently incorporated in the heater, is provided to control energization of the heater to maintain the liquid at a preset temperature. An apparatus 19 is provided for circulating the fluid in the casing. The receptacle 12 is disposed in a can 20 which projects into the casing so that the mixture therein is maintained at the preselected temperature, and the centrifuge is disposed in a housing 21 which also extends into the casing. A cover 22 may be provided on the housing to aid in maintaining the preset temperature therein.

After separating the oil and fat phases of the system, a measured part or sample of one phase is drawn off, as through the spigot 25 on the receptacle into a measuring receptacle 28. The radioactivity in the sample is then measured, as by a Geiger-Müller counter or gas flow counter 29.

The relationship of the radioactivity in the water and fat phases of the total system including the reagents added to the respective volumes of the water and fat phases can be conveniently expressed mathematically.

Let A equal the volume of the oil phase.

B equals the volume of the total mixture of system including the various reagents which have been added to the unknown test sample.

C equals the "partition coefficient" or ratio of the solubility of the labeled compound in the oil phase to the solubility of the compound in the water phase.

$y$ equals the total radioactivity (in counts per minute) which is added to the system.

$x$ equals the radioactivity (in counts per minute) which will be found in said oil phase.

Then (1) $$\frac{CA}{B-A} = \frac{x}{y-x}$$

It is an important feature of the present invention that the percentage composition of the mixture can be determined by measuring the radioactivity in only a portion of one of the two phases whereby complete separation and drawing off of one phase is not necessary. It is only essential to draw off a sample of one phase and measure the radioactivity in that sample. This may most conveniently be effected by drawing off a sample of the high percentage phase of the mixture, which in the case of milk, is the water phase.

The relationship of the radioactivity in the sample (of the water phase) to the radioactivity in the total water phase of the system can be expressed by the following proportionality:

(2) $$\frac{a}{Z} = \frac{y-x}{B-A}$$

where:

$a$ equals the radioactivity measured in the sample, in counts per minute;

Z equals the volume of the sample.

Solving Equation 1 for $y-x$:

(3) $$y-x = \frac{x(B-A)}{CA}$$

Solving Equation 2 for $x$:

(4) $$x = \frac{Zy - a(B-A)}{Z}$$

Substituting the value of $x$ in Equation 4 for $x$ in Equation 3:

(5) $\quad y - \dfrac{Zy+a(B-A)}{Z} = \dfrac{[Zy-a(B-A)][B-A]}{ZCA}$

Simplifying Equation 5 and solving for A:

(6) $\quad A = \dfrac{Zy-aB}{a(C-1)}$

From Equation 6 it is apparent that the volume of the oil phase can be determined by measuring the radioactivity in a sample of the water phase. This radioactivity in the sample can be measured, as diagrammatically shown in FIG. 4, with a Geiger-Müller or gas-flow type counter.

The volume of the labeled compound used in each test is very small and the change in volume of the oil phase A, due to the solution therein of the labeled compound, may, in most applications be disregarded. However, since the total amount of labeled compound and the "partition coefficient" of this compound is known, a correction in the calculated volume of A can be made, if desired. The reagents, other than the labeled compound, such as the de-emulsifying agents used for breaking the emulsion and the dilutents are such as to separate with the water phase and do not affect the volume of the oil phase. Therefore, the volume A represents the volume of the oil phase in the original specimen and, knowing the original volume of the specimen, the percentage composition of the specimen can be readily determined.

It is apparent that each of the terms in Equation 6 except A, the volume of the fat phase and $a$, the measured radioactivity in the sample of the water phase, can be kept constant for sucessive tests on different specimens. Thus, the volume of the sample Z; the volume of the specimen and reagents B; and the total radioactivity $y$ added to the system can be made constant by accurately standardizing the measurement of the respective volumes. However, if the radioactive material used has a relatively short "half-life," then proper consideration must be given to radioactive decay. Thus, if a prepared "batch" of the labeled compound is used for successive tests over a period which constitutes an appreciable portion of the "half-life" of the radioactive label, then the radioactivity of the labeled compound must be either periodically remeasured or a suitable correction made for the decay in radioactivity based upon the time lapse since the previous measurement of the radioactivity of the labeled compound. The "partition coefficient" C of the labeled compound will vary with the specific compound used and the temperature in the system. However, the partition coefficient for any particular compound will be maintained substantially constant if the temperature of the system is fixed. Therefore, the measurement of the volume of the oil phase, by measuring the radioactivity in a sample of the water phase, can be made empirically, if desired, and the radioactivity scaler which is connected to the Geiger-Müller or gas-flow counter can be calibrated to directly read the percentage composition of the mixture.

The Equation 6 can be rewritten in terms of $a$, the radioactivity measured in the sample of the water phase, as follows:

(7) $\quad a = \dfrac{yZ}{\dfrac{A}{B}(C-1)+1}$

The variation in the quantity $a$, the radioactivity in the sample of the water phase, with changes in the ratio of the oil to water phase in the total system is plotted in the graph shown in FIG. 5, for several different values of the partition coefficient C. The curve labeled $C=0$ corresponds to the plot of the equation when the partition coefficient is zero, that is, when the labeled compound is soluble only in the water phase and is insoluble in the oil phase. It is apparent from this curve that there is only a relatively small change in the quantity $a$ for each percentage change in the ratio of the oil to the water phase in the total system. However, when the partition coefficient C is made equal to a relatively high value of the order of 20 to 1 or 40 to 1 as indicated on the curves labeled $C=20:1$ and $C=40:1$ in FIG. 5, there is a relatively large change in the quantity $a$ for each percent change in the ratio of the oil to water phase in the total system. The accuracy of the method can thereby be materially enhanced by the use of a labeled compound having a high partition coefficient or ratio of solubility in the oil to water phase of the specimen. Moreover, it is to be noted that the curves corresponding to $C=20:1$ and $C=40:1$ are relatively steeper in the lower percentage ranges of the ratio of the oil to water phase. In order to utilize the improved accuracy achieved in this range, it is desirable, in measuring the percentage composition of mixtures having a relatively higher ratio of oil to water, to dilute the specimen with water so as to bring the resultant ratio of the total system within this range. This may be conveniently effected by diluting the reagents added to the specimen and by proportioning the quantity of the diluted reagent added so that the resultant ratio of oil to water in the total system lies preferably in a range of zero to three percent. Alternatively, the specimen can be diluted a known amount, before adding the reagents.

In conducting tests on milk, the following procedure may be followed:

An alkaline solution, such as sodium hydroxide or amonium hydroxide, is prepared and to this is added a labeled compound which has a high solubility in the oil phase and a low solubility in the water phase of the milk specimen. Various different compounds may be used such as tetraphenylthiourea and tetraethylthiourea, which compounds are not affected by the basicity of the solution. The compound is labeled with a radioactive isotope, such as carbon-14 or sulphur-35.

If the milk sample has a fat content of between 1% and 3%, one volume of the milk specimen is measured and one volume of the alkaline solution is measured and mixed with the measured quantity of milk. The milk sample and the reagents are brought to a preselected temperature before mixing and are maintained at that temperature during the testing process as by immersion in the bath contained in the casing 15. The basicity of the alkaline solution should be such that the final basicity of the total solution is about .05 to .1 N. The exact basicity of the final solution is not critical and need not be known. The amount of labeled compound added should be such that the radioactivity in the sample of the water phase can be easily measured by the counter. For example, the total radioactivity added to the system may be such that a total of between 8,000 and 15,000 counts in the sample may be made in a reasonable "counting time." Obviously, the amount of labeled compound which should be added will vary dependent on a number of factors such as the half-life of the isotope used; the "specific-activity" of the isotope; the percent fat in the specimen; the solubility of the compound in the basic solution and the "partition coefficient" of the labeled compound. The total number of "counts per minute" of radioactive material which are added to the basic solution must be known.

The mixture of the milk specimen and basic solution is then stirred to distribute and equilibrate the labeled compound between the two phases and is thereafter centrifuged for a relatively short time, such as four minutes, to separate the fat and water phases. A measured quantity of the water phase is then drawn off and the radioactivity in this sample measured. Then, knowing the volume (Z) of the sample; the total radioactivity in counts per minute (y); the measured radiocativity (a) in the sample; the volume of the specimen and the volume of reagents added (B); and the "partition coefficient" (C) a the temperature of the system, the volume (A) of the oil phase can be computed from Equation 6. Obviously, all of the above variables except (a) the measured radioactivity, can be maintained constant for successive tests. The counter could then be calibrated to indicate percent composition directly. Alternatively, charts similar to FIG. 5 can be prepared for the different labeled compounds used to facilitate determination of the composition of the sample.

When measuring the composition of other oil and water mixtures such as cream which has a higher percentage of fat, then it is preferable to either dilute the sample with a known amount of water or add sufficient water with the reagents to bring the percentage of oil in the total system below 3%. In this manner, the improved accuracy of the method in this low range can be utilized in measuring the composition of mixtures having a relatively higher percentage of fat. Thus, when measuring the composition of a specimen having an oil content in the range of 3 to 6%, three volumes of reagent may be added to one volume of specimen or the volume of specimen may be diluted with three parts of water for each part of specimen.

From the foregoing it is apparent that the volume of this specimen and the volume of the reagents containing the labeled compound can be standardized or made constant for successive tests on similar products. Similarly, the volume of the sample of one of the phases can also be made constant and, since it is only necessary to completely separate a portion of the sample from the remainder of the system, it is apparent that the method is adapted to be performed by apparatus which automatically measures and dispenses the specimen and reagents into a vessel, mixes the reagents therein, centrifuges the mixture and thereafter draws off a fixed quantity of one of the phases. Since the method produces an electrical signal correlative with the percentage of the water and fat phases, the composition of the mixture can be easily recorded on suitable recording apparatus or, if it is desired, maintain a preselected composition in the mixture from which the specimen is selected, the signal can be used to operate valves for adding either one or the other of the phases to that mixture to maintain the desired composition.

I claim:

1. The method of determining the composition of a specimen containing an oil phase and a water phase comprising, adding to the specimen a radioactive compound having different solubility in the oil and water phases of the specimen, separating a sample of one of said phases, and measuring the radioactivity in said sample as a measure of the composition of the specimen.

2. The method of determining the composition of a specimen containing an oil and a water phase comprising, measuring the volume of the specimen, adding a preselected volume of aqueous solution containing a radioactive compound having different solubility rate in the oil and water phases of the specimen, mixing the solution and specimen to distribute the radioactive compound between the two phases, centrifuging the mixture to separate the oil and water phases, measuring a sample of the water phase, and measuring the radioactivity in the sample as a measure of the composition of the specimen.

3. The method of determining the composition of a specimen having an oil and a water phase comprising, adding to the specimen a radioactive compound having a different solubility in the oil and water phases of the specimen while maintaining the resultant mixture at a preselected temperature, separating a sample of one phase, and measuring the radioactivity in the sample as a measure of the composition of the specimen.

4. The method of determining the composition of an oil and water mixture in which the volume of one of the phases is small as compared to the volume of the other phase comprising, measuring a volume of the mixture, adding to the measured volume of the mixture a radioactive compound having a high solubility in said one of said phases and a low solubility in the other of said phases, separating a sample of the other of said phases, and measuring the radioactivity in said sample as a measure of the composition of said oil and water mixture.

5. The method of measuring the amount of butter fat in milk and the like comprising measuring a volume of milk, adding an alkaline solution to the measured volume of milk, adding a radioactive compound having a solubility in butter fat which is high as compared to its solubility in the water phase, centrifuging the mixture to separate the oil and fat phases, separating a sample of the water phase, and measuring the radioactivity in the sample as a measure of the butter fat content in the milk.

6. The method of determining the composition of an oil and water mixture comprising measuring a volume of the mixture, adding to the measured volume of the mixture a radioactive compound having a high solubility rate in one of said phases and a low solubility rate in the other of said phases, adding a known quantity of diluent which is completely separable with said other of said phases, separating a sample of the other of said phase, and measuring the radioactivity in said sample as a measure of the composition of said oil and water mixture.

References Cited in the file of this patent

UNITED STATES PATENTS

| | | |
|---|---|---|
| 2,433,718 | Teplitz | Dec. 30, 1947 |
| 2,680,900 | Linderman | June 15, 1954 |
| 2,813,980 | De Witte | Nov. 19, 1957 |

OTHER REFERENCES

Peaceful Uses of Atomic Energy, United Nations Publication, New York, 1956; vol. 15, pp. 24 to 38 and 60 to 72.